Patented July 13, 1937

2,086,670

UNITED STATES PATENT OFFICE 2,086,670

TREE PROTECTION

Charles G. Grimes, Dayton, Ohio

No Drawing. Application August 19, 1932,
Serial No. 629,564

2 Claims. (Cl. 167—20)

This invention relates to the protection of trees from insect pests, gnawing animals and the like.

It is the principal object of this invention to provide a method of protecting trees, shrubbery, etc. from the action of insects, particularly those of the boring species or those which are deposited in or otherwise enter the tree, by killing the insects present in the tree and preventing the entrance of other insects into the tree so that the tree is freed of these pests.

It is a further object to provide a novel method of protecting the tree against rabbits and other gnawing animals in addition to protecting it from insect pests.

It is also an object to provide an inexpensive composition of matter adapted to be easily applied to a tree for the purpose of effectively protecting the tree against attack by insect and animal pests.

It is well recognized that considerable damage is done to trees, shrubs, and the like, by the action of insect pests of the boring species. These insects are in some cases deposited as larvae on the bark of the tree and as they develop they bore inwardly into the trunk of the tree. Not only are the borers injurious in themselves but certain insects are known to enter through any available opening of a tree such as the hole produced by a boring insect and to feed on the sap of the tree with consequent injury thereto.

It is also well recognized that many trees are destroyed through the action of gnawing animals such as rabbits which attack the base of the tree, either the trunk or the upper roots thereof, stripping the bark from the tree and thereby seriously injuring the tree and making it vulnerable to the attack of numerous other types of pests.

The present invention is designed to protect the tree from the action of these and similar pests and comprises the application to that portion of the tree to be protected, as the trunk and in some cases the limbs of the tree, of a coating composition having peculiar insect and animal repelling characteristics. This coating composition is adapted to dry rapidly on its outer surface so as to form a substantially impervious skin coating overlying the tree trunk. This coating is of such nature that it is highly objectionable in taste and smell to the gnawing type of animals so that the body of the tree is completely protected from their attack. The composition remains in the fluid state for a period of time after the formation of the outer surfacing layer, and is continuously effective in attacking and killing all grubs, larvae, insects and the like which are present in the tree. The composition includes a constituent which is adapted to be volatilized under normal outdoor temperature conditions, and escape outwardly being prevented by the overlying skin coating, the composition is forced into the interstices in the body of the tree, attacking and killing the insects, grubs, larvae, and the like, whether on the surface of the tree or in a remote part of the body thereof.

The volatile constituent which is used in the actual practicing of the invention preferably comprises one of the lighter fractions obtained in the distillation of petroleum. Practically any distillate of petroleum having volatile characteristics equal to or superior to those of coal oil can be used. The preferred material is petroleum spirits, as this has very desirable insect repelling and killing characteristics and at the same time is available at low cost. A lighter fraction may be used but it is preferred in the commercial practicing of the invention not to use any fraction heavier than of coal oil as this has been found to be approximately the upper limit as regards volatilization characteristics which gives uniformly satisfactory results.

The medium or vehicle for introducing the petroleum spirits onto the body of the tree and for retaining it on the surface thereof preferably comprises resins, oils and/or organic acids. This vehicle, besides being an active tree protecting agent itself, maintains the volatile material in position upon the tree for a suitable period of time, and thereby greatly increases and prolongs the effectiveness of the composition in freeing the tree of pests. In the actual practicing of the invention, the vehicle is comprised largely of rosin, this being inexpensive and having an odor objectionable to many of the animals and insects. A small amount of oils, and/or organic acids is used which permits of the use of a lower temperature during the treating operation. This mixture is treated by being heated to a suitably high temperature and the source of heat then removed.

Sulfur is added to the heated mass for the purpose of reacting with the rosin and the organic acid. Sulfur is added in such quantities as to increase the hardness of the product so that upon drying it presents a hard surface. Furthermore the reaction between the rosin and the sulfur results in the production of a material having an odor which is very objectionable to rabbits and the like and which effectively deters them from attacking the trunk of the tree.

In order to increase the rate of drying so as to quickly form a skin coating on the outer surface of the applied material, a small amount of a drying agent such as cobalt acetate is added. It will be understood that any well known drying agent can be used such as the drying oils or compounds of manganese or cobalt generally known as surface driers, cobalt being used because of its characteristic of being absorbed at a lower temperature.

As a specific example of a composition which has been found to give entirely satisfactory results, reference is made to the following: 120 pounds of rosin were heated with 2 gallons of oleic acid to approximately 350° F. The supply of heat was then removed and 2/3 of an ounce of cobalt acetate added. 9 pounds of flowers of sulfur were sifted over the material and stirred thereinto. Following the cooling of the mass, 14 gallons of petroleum spirits were added and the mixture was then ready to be applied to the tree. When the composition is to be stored it is preferable to add a non-crystallizing agent which may be a quantity of steam distilled turpentine, pure gum spirits of turpentine, volatile distillation products of rosin, volatile distillation products of coal tar, or functionally similar materials. When such materials were used, the quantity of petroleum spirits was reduced, the proportions being approximately 10½ gallons of petroleum spirits to 3½ gallons of the non-crystallizing agent in the composition described above.

The composition can be applied in any known manner, as by means of a brush or by spraying, to the trunk of the tree and is applied in sufficient quantity to produce a layer of substantial thickness. When applied in the evening during normal summer weather, it was found that the coating was dry and non-tacky to the touch the following morning. As the temperature increased during the day, the more volatile constituents of the composition were volatilized and as escape outwardly was prevented by the overlying skin coating, the composition was forced into all holes or crevices in the tree with the desired toxic effect upon the insect pests therein. The action of the volatile constituents in permeating, under a certain degree of pressure, all the interstices of the tree, makes it unnecessary for the actual liquid coating composition to penetrate the holes in the tree and it is immaterial whether the holes extend downwardly or upwardly.

The composition remains effective for an extended period of time, retaining its impervious character, and during the whole of the time the tree is effectively protected from attack by any type of pest. The composition in inexpensively produced, is easily applied, is not injurious either to the hands when applying the same or to the tree; similarly it contains no matter such as might be dangerous if generally exposed on trees. The rapidly drying characteristic is highly desirable in that the tree does not remain tacky and sticky.

While the process and product herein described constitute preferred embodiments of the invention, it is to be understood that the invention is not limited to this precise process and product, and that changes may be made therein without departing from the scope of the invention which is defined in the appended claims.

What is claimed is:

1. A substance for application to a tree to protect the same against the action of pests comprising approximately the following composition, rosin 120 pounds, oleic acid 2 gallons, sulfur 9 pounds, and a petroleum distillate 14 gallons.

2. A substance for application to a tree to protect the same against the action of pests comprising approximately the following composition, rosin 120 pounds, oleic acid 2 gallons, sulfur 9 pounds, a petroleum distillate 10½ gallons, and a non-crystallizing agent 3½ gallons.

CHARLES G. GRIMES.